United States Patent
Satzoda et al.

(10) Patent No.: US 10,417,816 B2
(45) Date of Patent: Sep. 17, 2019

(54) SYSTEM AND METHOD FOR DIGITAL ENVIRONMENT RECONSTRUCTION

(71) Applicant: Nauto, Inc., Palo Alto, CA (US)

(72) Inventors: Ravi Kumar Satzoda, Palo Alto, CA (US); Suchitra Sathyanarayana, Palo Alto, CA (US); Michael Gleeson-May, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 0 days.

(21) Appl. No.: 16/011,269

(22) Filed: Jun. 18, 2018

(65) Prior Publication Data

US 2018/0365888 A1    Dec. 20, 2018

Related U.S. Application Data

(60) Provisional application No. 62/521,106, filed on Jun. 16, 2017.

(51) Int. Cl.
*G06T 17/00* (2006.01)
*G06T 7/70* (2017.01)
(Continued)

(52) U.S. Cl.
CPC ........... *G06T 17/00* (2013.01); *G05D 1/0251* (2013.01); *G06K 9/00791* (2013.01); *G06K 9/6267* (2013.01); *G06N 3/0454* (2013.01); *G06T 7/70* (2017.01); *G06K 2209/23* (2013.01); *G06T 2207/10016* (2013.01); *G06T 2207/10028* (2013.01); *G06T 2207/20076* (2013.01); *G06T 2207/20084* (2013.01);
(Continued)

(58) Field of Classification Search
CPC ....... G06T 17/00; G06T 7/70; G06K 9/00791; G06K 9/6267; G05D 1/0251; G06N 1/0454
See application file for complete search history.

(56) References Cited

U.S. PATENT DOCUMENTS 6,496,117 B2   12/2002  Gutta et al.
6,927,694 B1    8/2005  Smith et al.
(Continued)

FOREIGN PATENT DOCUMENTS

DE    102009005730      7/2010
EP       3057061 B1    8/2017
(Continued)

OTHER PUBLICATIONS

"Which P&C Insurers Have Filed Patents Related to Autonomous Vehicles", Dec. 14, 2016, https://www.cbinsights.com/research/autonomous-vehicle-insurance-patents/?ReillyBrennanFoT, downloaded from the internet on Sep. 4, 2018, 8 pages.
(Continued)

*Primary Examiner* — Behrang Badii
*Assistant Examiner* — Daniel L Greene
(74) *Attorney, Agent, or Firm* — Perkins Coie LLP; Michael A. Glenn

(57) ABSTRACT

A method for digital environment reconstruction, including: capturing data using an onboard vehicle system; determining a vehicle event and an event class of the vehicle event; extracting a set of agent parameters from the data; generating a virtual model based on the set of agent parameters; and providing the virtual model to a remote system.

20 Claims, 10 Drawing Sheets

(51) Int. Cl.
*G06N 3/04* (2006.01)
*G06K 9/00* (2006.01)
*G05D 1/02* (2006.01)
*G06K 9/62* (2006.01)

(52) U.S. Cl.
CPC ............ *G06T 2207/30192* (2013.01); *G06T 2207/30241* (2013.01); *G06T 2207/30252* (2013.01)

(56) References Cited

U.S. PATENT DOCUMENTS

| | | |
|---|---|---|
| 7,639,148 B2 | 12/2009 | Victor |
| 7,974,748 B2 | 7/2011 | Goerick et al. |
| 8,022,831 B1 | 9/2011 | Wood-Eyre |
| 8,195,394 B1 | 6/2012 | Zhu et al. |
| 8,266,132 B2 | 9/2012 | Ofek et al. |
| 8,369,608 B2 | 2/2013 | Gunaratne |
| 8,510,196 B1 | 8/2013 | Brandmaier et al. |
| 8,666,644 B2 | 3/2014 | Goto |
| 8,761,439 B1 | 6/2014 | Kumar et al. |
| 8,862,380 B2 | 10/2014 | Jung |
| 9,081,650 B1 | 7/2015 | Brinkmann et al. |
| 9,146,558 B2 | 9/2015 | Field et al. |
| 9,327,743 B2 | 5/2016 | Green et al. |
| 9,330,571 B2 | 5/2016 | Ferguson et al. |
| 9,465,978 B2 | 10/2016 | Hachisuka et al. |
| 9,472,102 B2 | 10/2016 | McClain et al. |
| 9,514,626 B2 | 12/2016 | Wu et al. |
| 9,535,878 B1 | 1/2017 | Brinkmann et al. |
| 9,701,307 B1* | 7/2017 | Newman ............... B60W 30/09 |
| 9,731,727 B2 | 8/2017 | Heim et al. |
| 9,767,625 B1 | 9/2017 | Snyder et al. |
| 9,845,097 B2 | 12/2017 | Prakah-Asante et al. |
| 9,928,432 B1* | 3/2018 | Sathyanarayana ... G05D 1/0088 |
| 2002/0082806 A1 | 6/2002 | Kaub |
| 2003/0169907 A1 | 9/2003 | Edwards et al. |
| 2004/0168148 A1 | 8/2004 | Goncalves et al. |
| 2005/0002558 A1 | 1/2005 | Franke et al. |
| 2006/0247847 A1 | 11/2006 | Carter et al. |
| 2007/0100669 A1 | 5/2007 | Wargin et al. |
| 2007/0120948 A1 | 5/2007 | Fujioka et al. |
| 2008/0025568 A1 | 1/2008 | Han et al. |
| 2008/0075367 A1 | 3/2008 | Winn et al. |
| 2008/0084283 A1 | 4/2008 | Kalik |
| 2008/0167814 A1 | 7/2008 | Samarasekera et al. |
| 2008/0252412 A1 | 10/2008 | Larsson et al. |
| 2009/0080697 A1 | 3/2009 | Kishikawa et al. |
| 2009/0244291 A1* | 10/2009 | Saptharishi ........ G06K 9/00771 348/187 |
| 2010/0209881 A1 | 8/2010 | Lin et al. |
| 2010/0215254 A1 | 8/2010 | Prokhorov |
| 2010/0238009 A1 | 9/2010 | Cook et al. |
| 2010/0312745 A1 | 12/2010 | Tabak |
| 2012/0027258 A1 | 2/2012 | Uchida et al. |
| 2012/0123806 A1 | 5/2012 | Schumann et al. |
| 2012/0263346 A1 | 10/2012 | Datta et al. |
| 2013/0073114 A1 | 3/2013 | Nemat-Nasser et al. |
| 2013/0142390 A1 | 6/2013 | Othmezouri et al. |
| 2013/0194127 A1 | 8/2013 | Ishihara et al. |
| 2014/0037138 A1 | 2/2014 | Sato et al. |
| 2014/0139655 A1 | 5/2014 | Mimar |
| 2014/0195477 A1 | 7/2014 | Graumann et al. |
| 2014/0210978 A1 | 7/2014 | Gunaratne et al. |
| 2014/0214255 A1 | 7/2014 | Dolgov et al. |
| 2014/0267703 A1 | 9/2014 | Taylor et al. |
| 2014/0297170 A1 | 10/2014 | Sakima et al. |
| 2014/0324281 A1 | 10/2014 | Nemat-Nasser et al. |
| 2015/0084757 A1 | 3/2015 | Annibale et al. |
| 2015/0086078 A1 | 3/2015 | Sibiryakov |
| 2015/0094089 A1* | 4/2015 | Moeglein ............... H04W 4/029 455/456.1 |
| 2015/0140991 A1 | 5/2015 | Silver et al. |
| 2015/0269438 A1 | 9/2015 | Samarasekera et al. |
| 2015/0284001 A1 | 10/2015 | Watanabe et al. |
| 2015/0344030 A1 | 12/2015 | Damerow et al. |
| 2015/0348388 A1* | 12/2015 | Teller ................. G06K 9/00671 340/937 |
| 2015/0370250 A1* | 12/2015 | Bachrach ............. G05D 1/0016 701/2 |
| 2015/0375756 A1 | 12/2015 | Do et al. |
| 2015/0379715 A1 | 12/2015 | Chandrasekar et al. |
| 2016/0078303 A1 | 3/2016 | Samarasekera et al. |
| 2016/0140729 A1* | 5/2016 | Soatto ....................... G01S 5/16 348/135 |
| 2016/0147230 A1 | 5/2016 | Munich et al. |
| 2016/0163198 A1 | 6/2016 | Dougherty |
| 2016/0176397 A1 | 6/2016 | Prokhorov et al. |
| 2016/0203373 A1 | 7/2016 | Menashe et al. |
| 2016/0267335 A1 | 9/2016 | Hampiholi |
| 2016/0275796 A1 | 9/2016 | Kim et al. |
| 2017/0039848 A1 | 2/2017 | Hakeem |
| 2017/0055868 A1 | 3/2017 | Hatakeyama |
| 2017/0109828 A1 | 4/2017 | Pierce et al. |
| 2017/0140231 A1 | 5/2017 | Chen et al. |
| 2017/0193830 A1* | 7/2017 | Fragoso ................ G08G 5/0069 |
| 2017/0248952 A1 | 8/2017 | Perkins et al. |
| 2017/0287163 A1 | 10/2017 | Kaufmann et al. |
| 2018/0075309 A1 | 3/2018 | Sathyanarayana et al. |
| 2018/0172454 A1* | 6/2018 | Ghadiok ................ G01C 21/28 |
| 2018/0176173 A1* | 6/2018 | Keysers ................ G06N 7/005 |
| 2018/0186366 A1* | 7/2018 | Gordon ............... B60W 30/085 |
| 2018/0239144 A1* | 8/2018 | Woods ............... G02B 27/0172 |

FOREIGN PATENT DOCUMENTS

| | | |
|---|---|---|
| GB | 2506365 A | 4/2014 |
| WO | 2014154771 A1 | 10/2014 |
| WO | 2015184578 A1 | 12/2015 |
| WO | 2018039560 A1 | 3/2018 |

OTHER PUBLICATIONS

Guo Feng: et al. "Task 3-Evaluating the Relationship Between Near-Crashes and Crashes: Can Near-Crashes Serve as a Surrogate Safety Metric for Crashes?" Virginia Tech Transportation Institute, U.S. Department of Transportation, Sep. 2010., Nov. 6, 2017, 73 pages.

Chen, et al. " Monocular 3D Object Detection for Autonomous Driving" 2016 IEEE Conference on Computer Vision and Pattern Recognition, Jun. 2016, pp. 2147-2156.

Montemerlo, et al "Junior: The Stanford Entry in the Urban Challenge" Journal of Field Robotics, Sep. 2008, 25(9):569-597.

* cited by examiner

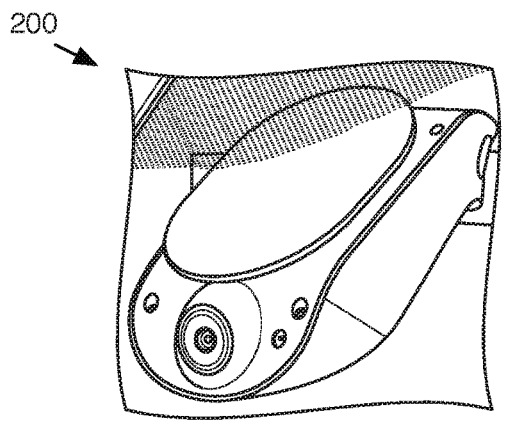
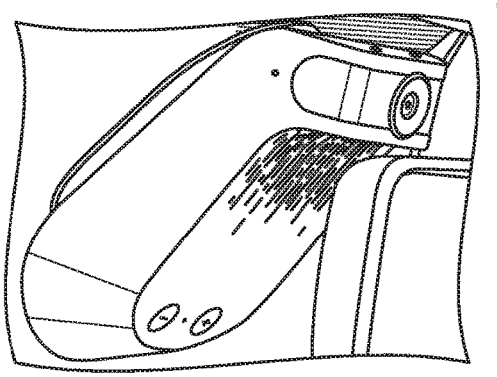
FIGURE 3A  FIGURE 3B
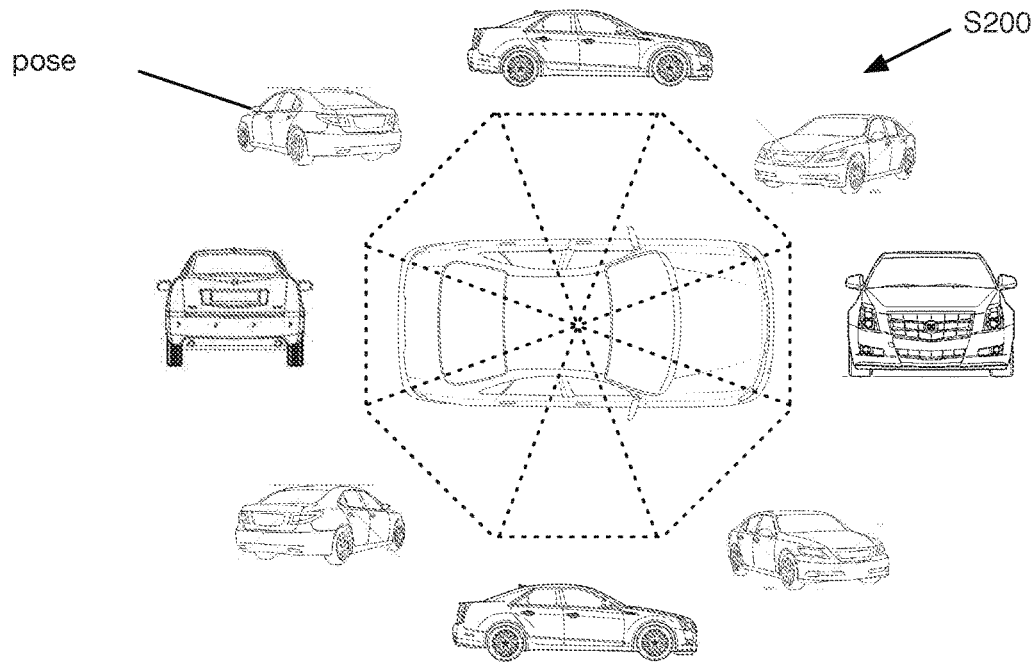
FIGURE 4

SYSTEM AND METHOD FOR DIGITAL ENVIRONMENT RECONSTRUCTION

CROSS-REFERENCE TO RELATED APPLICATIONS

This application claims the benefit of U.S. Provisional Application Ser. No. 62/521,106, filed 16 Jun. 2017, which is incorporated herein in its entirety by this reference.

TECHNICAL FIELD

This invention relates generally to the digital mapping field, and more specifically to a new and useful system and method for 3D reconstruction in the computer vision field.

BACKGROUND

Generating digital reconstructions of real-world, three-dimensional (3D) vehicle events by conventional means is often a time-consuming, expensive, and difficult process. First, it often relies on the collection of high-fidelity 3D data that can be difficult and expensive to obtain, due to the high cost of and low availability of the knowhow to operate the requisite sensors. Second, due to the difficulty and expense of obtaining such data, it is often impossible or impractical to deploy such detection at scale and thus existing solutions can fail to adequately capture, map, or analyze edge cases (e.g., rare events), which can be especially desirable to obtain (e.g., for development of robust control algorithms). Furthermore, many conventional methods for reconstructing 3D environments can be labor intensive, often work only in specific or specialized contexts, and can produce reconstructed geometry that contains undesirable defects, among other disadvantages.

Thus, there is a need in the digital mapping field to create a new and useful system and method for environmental reconstruction and analysis. This invention provides such new and useful system and method.

BRIEF DESCRIPTION OF THE FIGURES

FIGS. 3A and 3B are views of the external and internal-facing cameras of a specific example of the onboard vehicle system.

FIG. 4 is a schematic representation of a set of detectable poses for an example object.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
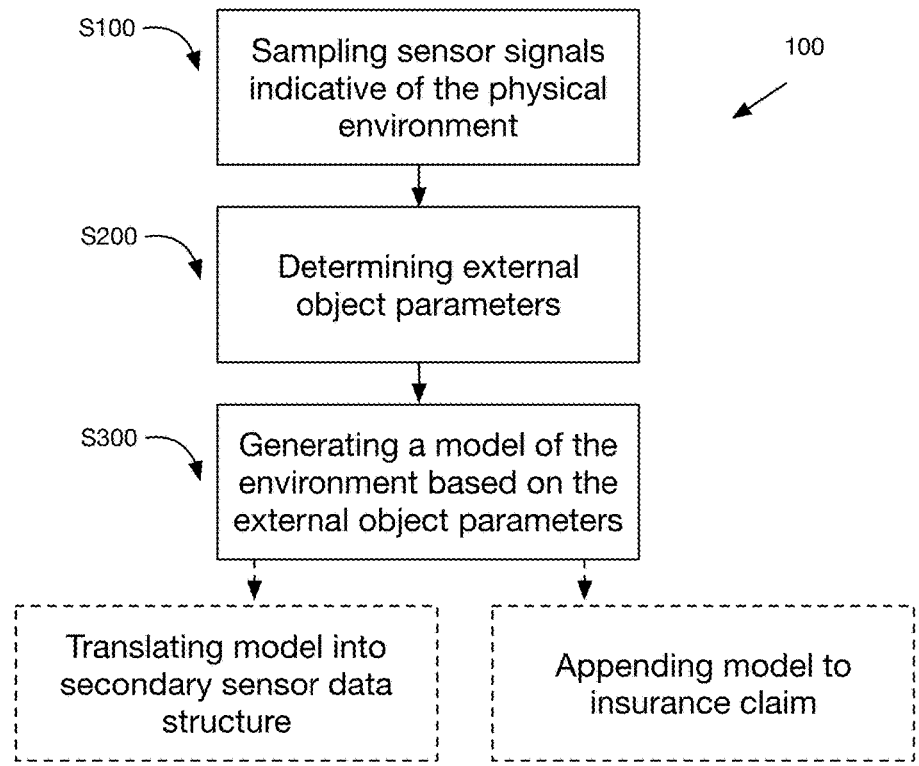
FIG. 1 is a flowchart of the method for environmental reconstruction.

As shown in FIG. 1, the method 100 for environmental reconstruction includes: sampling sensor signals indicative of the physical environment S100; determining external object parameters based on the sensor signals S200; and generating a virtual model of the environment based on the external object parameters S300.

The method 100 functions to generate reconstructions of the in-situ environment (e.g., vehicle interior, vehicle exterior, etc.) experienced by a vehicle. For example, the method can generate 3D models of real-world route conditions, which can be used by secondary onboard vehicle systems (e.g., LIDAR, TOF, etc.) as training sets or in other applications (e.g., ex post facto vehicle event reconstruction). In a second example, the method can generate 3D reconstructions (e.g., exterior obstacles and travel paths, internal vehicle conditions, agent parameters during a vehicle event, etc.) of vehicle accidents (e.g., static scene, moments leading up to the accident, moments after the accident, etc.). The method can also function to generate abstracted representations (e.g., virtual models) of vehicle events (e.g., driving events, events that occur with respect to a vehicle while driving, etc.), which can include agents (e.g., objects that operate in the traffic environment, moving objects, controllable objects in the vehicle environment, etc.) and agent parameters; provide abstracted representations of vehicle events to a third party (e.g., a vehicle controller, an autonomous vehicle operator, an insurer, a claim adjuster, and any other third party, etc.).

In relation to the method 100, objects can include agents (e.g., controllable objects, objects possessing agency, moving or movable objects, etc.). Portions of the method described as implemented with respect to objects can be implemented with respect to agents, and vice versa.

The method 100 and portions thereof can be performed in real-time (e.g., as images or other sensor data is recorded), asynchronously from image recordation, iteratively (e.g., cycling in substantially real time, iterating after sensor signal recordation, etc.), and/or at any other suitable time with any other suitable temporal characteristics.

2. Benefits

The system, method and variations thereof can confer several benefits and/or advantages.

First, variations of the system and method can obtain high-fidelity route data and/or edge case data by leveraging data from ubiquitous, inexpensive, multi-use, and/or otherwise prolific sensors (e.g., cameras, camera-enabled devices, monocular cameras integrated into vehicles, etc.) which can be deployed at scale (e.g., crowdsourced data has a higher probability of including edge case data).

Second, variations of the system and method can reconstruct 3D models from 2D imagery, which can be translated and/or transformed for use with other vehicle sensor systems (e.g., LIDAR, stereo cameras, collections of monocular cameras, etc.). These 3D models can be augmented, verified, and/or otherwise processed using auxiliary sensor data.

Third, variations of the system and method can reconstruct 3D models from 3D sensor data (e.g., stereocamera data, LIDAR data, radar data, etc.). These 3D models can be augmented, verified, and/or otherwise processed using auxiliary sensor data in a substantially identical manner to those reconstructed from 2D imagery.

Fourth, variations of the system and method utilizing a single viewing sensor can generate 3D models of moving agents within an environment from data captured by a sensor moving relative to both the agent and the environment (e.g., moving relative to an external frame and/or the agent). For example, the method can leverage known intrinsic camera parameters, dynamically determined extrinsic camera parameters (e.g., vehicle location, vehicle pose, etc., determined by running secondary computer vision processes on the same or different images, determined via GPS sensors, etc.), known external static features, known agent geometries, determined agent motion (e.g., using photogrammatic range imaging techniques, LIDAR, radar, etc.), and/or other feature values to determine external agent geometries, pose, trajectory, or other agent parameters.

However, the system, method, and/or variations thereof can additionally or alternatively afford any other suitable benefits and/or advantages.

3. System.

Figure 2:
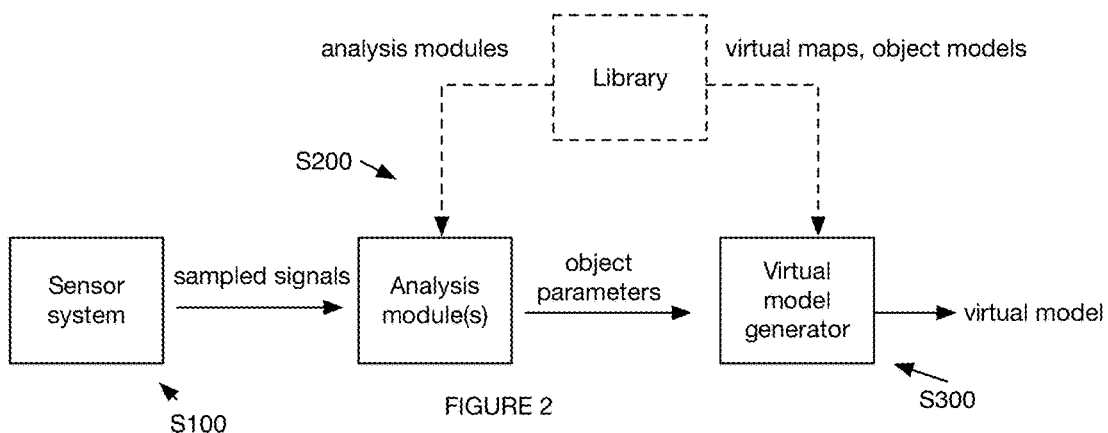
FIG. 2 is a schematic representation of a system for environmental reconstruction.
Figure 14:
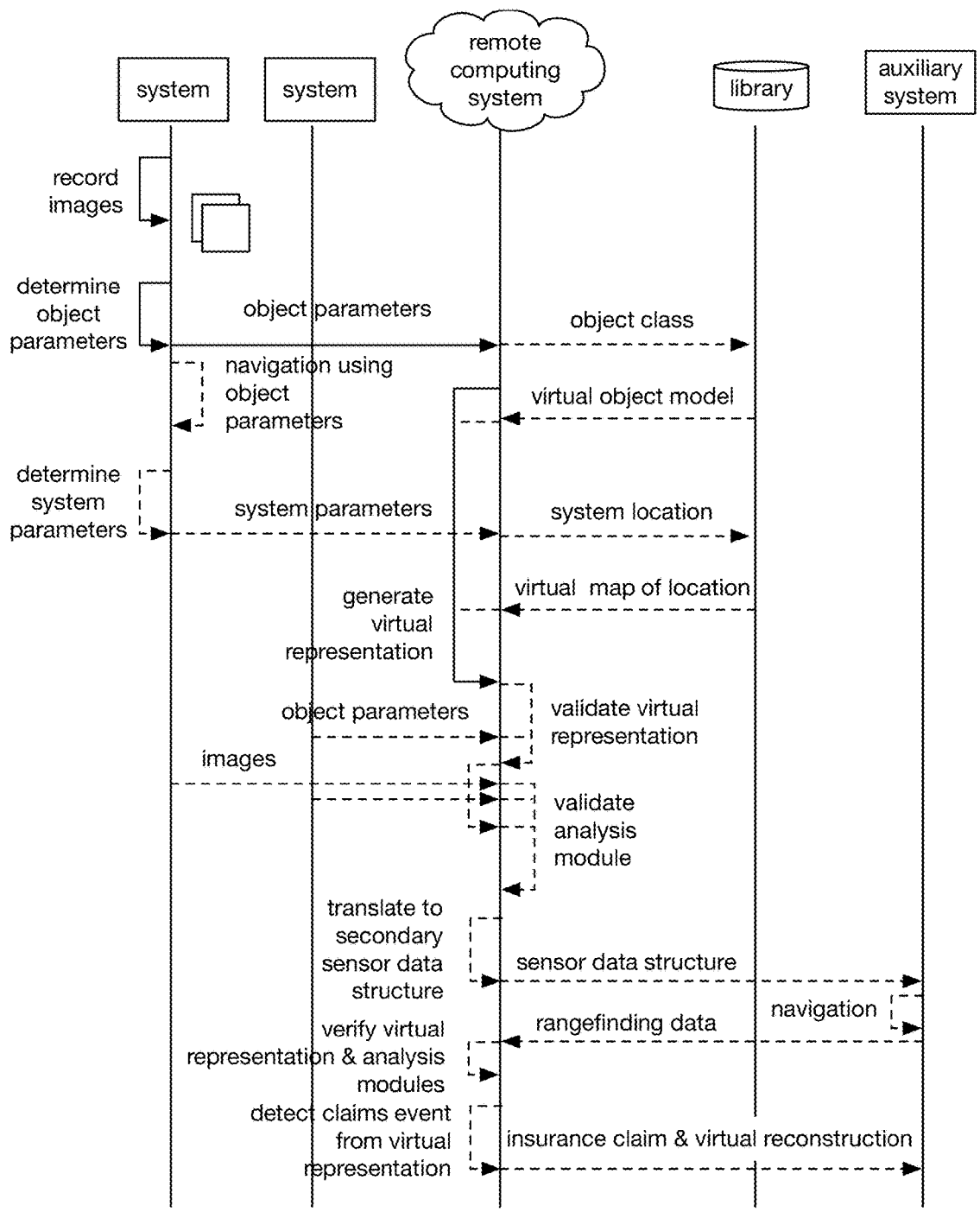
FIG. 14 is an example of the method.

The method 100 can be performed by a system 200 including one or more onboard vehicle systems and analysis modules (e.g., as shown in FIG. 2). The system 200 can optionally include training modules, modeling modules, translation modules, databases, and any other suitable elements and/or components. However, the method 100 can be performed using, by, and/or in conjunction with any suitable system. All or a portion of the modules and/or processes can be executed by a remote computing system (e.g., centralized computing system, distributed computing system, etc.; remote server system, etc.), by an integrated onboard vehicle system associated with a vehicle (e.g., at a processor of such an onboard vehicle system, at an onboard vehicle system, etc.), by a set of user devices (e.g., smartphone, smartwatch, etc.), or by any other suitable system. For example, each onboard vehicle system can include a condensed version of the analysis modules stored by a remote computing system. In another example, the onboard vehicle systems perform the computer vision analyses, and transmit the parameter values to a central modeling system (example shown in FIG. 14). However, the modules can be otherwise distributed and executed.

The onboard vehicle system functions to sample measurements of the environment (example shown in FIGS. 3A and 3B). The system can include one or more onboard vehicle systems, wherein multiple onboard vehicle systems can be arranged on the same or different vehicles. The onboard vehicle system can include: optical sensors, such as cameras; orientation sensors (IMUs, gyroscopes, accelerometers, magnetometers, etc.); location or motion tracking sensors (e.g., GPS, RTK-GPS, trilateration, odometers, optical flow, etc.); acoustic sensors (e.g., microphones, radar, sonar, etc.); depth sensors (e.g., LIDAR, TOF, etc.); or any other suitable sensor subsystem. The camera subsystems can be: monocular cameras, stereocameras, or have any suitable number of lenses or points of view. The camera subsystem can include an inward-facing camera (e.g., directed toward the vehicle interior), outward-facing camera (e.g., exterior-facing camera, directed toward the vehicle exterior, etc.), or any suitable camera arranged in any suitable orientation. When the camera subsystem includes an inward- and outward-facing camera, the physical relationship between the respective fields of view are preferably known and mapped, such that a pixel or region of the outward-facing camera's field of view can be correlated to a pixel or region of the inward-facing camera's field of view. However, the inward- and outward-facing cameras can be otherwise related. The camera(s) preferably sample in the visible range, but can alternatively or additionally sample in any suitable wavelength range. The intrinsics of each camera (e.g., focal length, image sensor format, principal point) are preferably known, but can alternatively be estimated, otherwise determined, or unknown (e.g., not predetermined). The extrinsics of each camera (e.g., camera center position, camera heading, camera pose, camera orientation, other camera position parameters in world coordinates, etc.) are preferably known or determined (e.g., based on auxiliary sensor data sampled concurrently or within a time period of camera frame sampling), but can be unknown or have any other suitable measure of certainty. The camera subsystem can be associated with a coordinate mapping system that maps the camera field of view (or other camera features) to a world coordinate, wherein the mapping system can be predetermined, automatically determined (e.g., based on sampled sensor signals), or otherwise determined. However, agents and/or other objects determined in the sampled image(s) can be otherwise associated with a physical location.

The sensor subsystems (e.g., of the onboard vehicle system, of the vehicle itself, of the onboard vehicle system and related components which are not onboard the vehicle, etc.) are preferably synchronized with each other (e.g., share a common clock, are synchronized to the GPS clock, etc.), but can alternatively be synchronized to different clocks (e.g., synchronized after signal sampling), unsynchronized, or otherwise suitably temporally related (e.g., and can sample data in a temporally related or unrelated manner). In a variation, the onboard vehicle system can be housed in a single housing and mountable (e.g., removably mountable, permanently mountable) to a vehicle (e.g., vehicle interior or exterior) using a set of mounting mechanisms (e.g., adhesive, screws, clips, suction cups, etc.); however, in alternative variations the onboard vehicle system can be otherwise suitably configured. The onboard vehicle system can optionally include a processing system that functions to process the sampled signals, communication system (e.g., Bluetooth, WiFi, cellular, etc.) that functions to communicate signals and/or extracted data to the remote computing system, or any other suitable component.

The analysis module(s) can function to detect one or more agents (e.g., objects, static objects, moving objects, controllable objects, etc.) in an image, determine agent classes or labels, determine agent parameters (location, pose, distance from onboard vehicle system, kinematic parameters, etc.), map static object positions, and/or perform any other suitable image, agent, and/or object analysis process. The system (e.g., onboard vehicle system, system including communicatively coupled processing modules, etc.) can include one or more analysis modules. The analysis module(s) can utilize (e.g., in performing one or more analysis processes) one or more of: regression, classification, neural networks (e.g., convolutional neural networks), heuristics, equations (e.g., weighted equations, parametric equations, systems of equations, etc.), estimation, selection (e.g., from a library, database, API, etc.), instance-based methods (e.g., nearest neighbor), regularization methods (e.g., ridge regression), decision trees, Bayesian methods, kernel methods, probability, deterministics, sensor fusion techniques, or any other suitable method. The system can include different analysis modules for each processing task (e.g., one for feature extraction, one for agent detection, one for agent classification, one for agent pose determination, etc.), include multiple analysis modules for each task (e.g., a series of analysis modules for a single task; different analysis modules for different environmental or temporal contexts, such as day, night, or rain for a given task; etc.), include a single analysis module for multiple tasks, or include any suitable number of modules corresponding to tasks in any suitable manner.

For example, the system can include one or more feature detectors (e.g., using edge detection, interest point detection, region of interest detection, ridge detection, etc.) that feed one or more object detectors (e.g., using Adaboost detector; a deformable part model object detector; a spatial pyramid matching object detector; regionlet object detector; CNN; module trained using SVM(s); etc.), pose estimators and/or pose classifiers, (e.g., using geometric methods, genetic algorithm methods, learning based methods, classification methods leveraging known viewing-angle-dependent object features, etc.), photogrammetric range imaging modules (e.g., using structure from motion methods, etc.), position estimators and/or position classifiers (e.g., using geometric methods, genetic algorithm methods, learning based methods, classification methods leveraging known range-dependent object features, etc.), or other modules to determine object parameters. In one example, the system can include a different analysis module for each of a set of viewing angles of a given object (e.g., different analysis modules to identify the front, back, left, right, isometric front right, isometric front left, isometric back right, isometric back left, etc. of an object class, such as a car, subclass, such as a sedan, or specific model and year, such as a 2017 Acura NSX; etc.). However, the system can include any suitable number of analysis modules for any suitable set of objects. The extracted features, object parameters, and/or other information can optionally be fed into an object-tracking module to determine object motion (e.g., using optical flow, kernel-based tracking, contour tracking, feature tracking, etc.). However, the system can include any suitable set of modules.

The system can optionally include localization modules, such as trilateration modules, GPS modules, dead-reckoning modules, SLAM modules, RRT modules, and/or other pose estimation modules to determine the onboard vehicle system and/or vehicle location.

The system can optionally include training module(s), which function to generate and/or refine the analysis module(s) by training (e.g., machine learning). The training modules can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. The training data can be historic imagery and/or auxiliary sensor data, new imagery or data (e.g., recorded in real-time), or include any other suitable set of data. Each analysis module can be validated, verified, reinforced, calibrated, or otherwise updated based on newly received, up-to-date measurements; past measurements recorded during the operating session; historic measurements recorded during past operating sessions; or be updated based on any other suitable data. Each analysis module can be run or updated: in response to determination of an actual result differing from an expected result; once; at a predetermined frequency; at any other suitable frequency, determined in any other suitable manner; or having any other suitable temporal characteristics. The analysis and/or training module(s) can be run or updated concurrently with one or more other modules, serially, at varying frequencies, or at any other suitable time.

The modeling module functions to generate a virtual reconstruction of the physical space surrounding and/or encompassing the sensor module and/or vehicle (e.g., a virtual model). The virtual reconstruction can be structured as a point cloud, vector space, matrix, or have any other suitable representation or structure. The virtual reconstruction is preferably represented in 3D Euclidean space, but can alternatively have any suitable dimensionality and/or any suitable coordinate system. In one variation, the modeling module reconstructs the physical space from only the sensor measurements (e.g., using photogrammetric techniques, etc.). In a second variation, the modeling module includes a predetermined virtual map of static physical features for the given geographic location, and populates the virtual map with virtual objects (e.g., wherein the classification, pose, and any other suitable parameters of the virtual objects are identified or otherwise determined from the sensor measurements). The object geometries can be retrieved (e.g., based on the object classification), determined from the sensor measurements, or be otherwise determined. The static features of the virtual map can additionally or alternatively be adjusted based on static feature parameters extracted from the sensor measurements (e.g., when a static feature is missing from the sensor measurement, when a new static feature is detected in the sensor measurement, etc.). The virtual representation can additionally or alternatively be packaged into a datafile (e.g., a CSV file, a JSON object, etc.) that encodes a frame-by-frame list of agent parameters (e.g., agent positions, agent poses, agent trajectories, etc.). The virtual representation can, in variations, be anonymized (e.g., stripped of personally identifying information/PII) and/or non-anonymized (e.g., retain PII). However, the modeling module can otherwise suitably generate the 3D representation of the physical space in any other suitable manner.

The system can optionally include one or more translation modules, which functions to translate the virtual representation into secondary data, readable by a secondary sensor. This can enable a virtual representation, generated from 2D images, to be interpreted as the input to a multi-dimensional sensing system, such as a rangefinding system (e.g., LIDAR, TOF), and/or any other suitable sensing system that utilizes a different format of data input than 2D images (e.g., as can be captured using a monocular camera). The system can include a single translation module for multiple secondary sensors, a different translation module for each secondary sensor, or any suitable number of translation modules for any suitable number of sensors. The translation modules can also function to apply a filter, parameter (e.g., noise parameter), and any other suitable transformation to the virtual representation. The translation modules can be predetermined (e.g., manually determined), automatically determined, or otherwise determined.

The system can optionally include one or more libraries (e.g., data libraries), which functions to provide known parameter values (e.g., values of agent parameters, object parameters, etc.). The system can include libraries including: virtual maps of static features for a geographic location, landmark geographic locations (e.g., landmark parameters, such as appearance as a function of viewing angle, in conjunction with the geographic location of the landmark), virtual object models (e.g., for objects with static geometries, such as the make of a car, a traffic sign, etc.; for use in deformable modeling), reference images for each face of a given object (e.g., images of the front, back, left, right, isometric front right, isometric front left, isometric back right, isometric back left, etc.), segmentation cues or feature relationships for a given object, or any other suitable reference data. The libraries can be manually generated (e.g., by a human operator in conjunction with a computer-aided design program, by selection of objects from a database of objects and placement within a virtual environment, etc.), learned (e.g., from a set of images or corpus; refined as more images are recorded and added to a corpus), or otherwise generated.

In an example, the virtual map of a geographic region can be generated by a 3D mapping system (e.g., including a LIDAR or other rangefinding system that scans the geographic region as the mapping system passes through the region while coupled to a vehicle). In a second example, the virtual map can be generated from municipal datasets (e.g., maps, construction drawings, etc.). In a third example, the virtual map can be generated from a plurality of images collected by one or more vehicles during one or more passes through the geographic region. In a specific example, the virtual map can be generated from common features detected across the multiple images for a given geographic region. However, the virtual map and/or object models can be otherwise generated.

4. Method.

Sampling sensor signals indicative of the physical environment S100 functions to obtain data for environmental reconstruction. The sensor signals are preferably sampled by an onboard vehicle system mounted to a mobile mounting point (e.g., vehicle), but can additionally or alternatively be sampled by auxiliary sensors (e.g., sensors mounted to static surfaces of the physical environment, such as security cameras, etc.), or by any suitable system. The sensor signals can be sampled continuously, in response to occurrence of a sampling event (e.g., when a vehicle vibration exceeds a vibration threshold, when a user instruction is received, etc.), or at any other suitable time. The sensor samples can be: optical, acoustic, vibration, light, kinematic, temperature, pressure, vehicular operation parameters, or be a measurement of any other suitable parameter. The sensor samples can be 2D images (e.g., a 2D projection of a 3D external scene) recorded by a monocular camera, but can additionally or alternatively be a stereoimage pair, a time-of-flight measurement, or be any other suitable measurement of 2D and/or 3D data. The 3D external scene can be the ambient environment surrounding the vehicle, but can additionally or alternatively be the ambient environment within the vehicle (e.g., cabin interior), or be any suitable scene. The images are preferably captured in the visible range, but can alternatively or additionally be hyperspectral, multispectral, IR, UV, or be captured in any suitable wavelength or set thereof.

In a first variation, S100 includes capturing image data using a camera of an onboard vehicle system coupled to a vehicle, wherein the image data depicts an exterior environment of the vehicle. In an example of this variation, the image data can include an image sequence (e.g., a video clip, a set of images collected over a time interval, etc.); however, in related examples, the image data can include a single image. The image data preferably includes two dimensional (2D) image data, but can additionally or alternatively include multi-dimensional image data (e.g., stereo imagery, hyperspectral imagery, etc.). In another specific example of this variation, S100 includes capturing an image sequence (e.g., defining a set of frames) within a time interval using a monocular camera of an onboard vehicle system mounted to a windshield of a vehicle. However, S100 can include capturing image data of any other suitable type using any suitable imaging sensor.

The method can optionally include sampling auxiliary signals, which function to supplement, assist in interpretation of, or validate the primary signals recorded in S100. The auxiliary signals are preferably temporally associated with one or more primary signals (e.g., recorded concurrently with or within a predetermined time window of the primary signal recordation time), but can be spatially associated with the primary signal (e.g., record measurements of the same physical point in the external scene) or otherwise associated with the primary signal. The auxiliary signals can be rangefinding signals (e.g., recorded by radar, sonar, LIDAR, TOF, etc.), acoustic signals (e.g., wherein the acoustic signature is associated with a predetermined object or location), beacon signals (e.g., from WAPs, Bluetooth nodes, cellular towers, etc.), additional sensor data from the vehicle (e.g., sampled from an OBD port, an OBD module coupled to an OBD port, etc.; a vehicle computer that monitors vehicle component parameters such as temperature, RPM, vehicle speed, etc.; any other suitable vehicle related sensor data; etc.), and/or any other suitable set of signals.

Block S100 can optionally include Block S110, which includes: determining vehicle event data based on the sampled sensor signals. Block S110 is preferably performed by an onboard vehicle system as described above, but can additionally or alternatively be performed by any other suitable system or subsystem. Vehicle events associated with the vehicle event data determined in Block S110 can include: near-collision event, collision events, traffic events (e.g., merging, lane-keeping, slowing to a stop, operating in stop-and-go traffic, accelerating from a stop to a speed limit, holding a determined distance from a leading vehicle, etc.), but can additionally or alternatively include any suitable data related to events that occur in relation to a vehicle. In variations, Block S110 can be performed by a plurality of onboard vehicle systems associated with a plurality of vehicles (e.g., wherein each vehicle is equipped with one onboard vehicle system) over a time period (e.g., an hour, a day, a week, a continuously increasing data collection period, etc.), in order to generate a vehicle event dataset corresponding to a population of vehicles. However, Block S110 can be otherwise suitably performed.

Determining vehicle event data can include determining a vehicle event type (e.g., event type), which can be associated with any suitable vehicle event. Vehicle event types are preferably categorical distinctions between vehicle events (e.g., by traffic maneuver; by risk value, such as high risk, medium risk, and low risk; by agent type, such as vehicle type, pedestrian, etc.; by any other suitable categorical distinction, etc.), but can additionally or alternatively include event labels, event classes, and any other suitable event typing data.

Block S110 can include detecting a near-collision events, which can include high-risk vehicle events occurring proximal to the vehicle (e.g., the ego-vehicle, the vehicle to which the onboard system is coupled, etc.). A near-collision event can be a circumstance requiring an evasive maneuver by the vehicle operator; a circumstance wherein the vehicle has greater than a threshold probability of colliding with an object; or be otherwise defined. Near-collision events and related high-risk behaviors can include: tailgating (e.g., driving within a threshold distance behind a leading vehicle, wherein the threshold distance can be speed-dependent), swerving (e.g., adjusting the lateral position of the vehicle at a rate higher than a threshold rate of adjustment), driver distraction (e.g., based on video analysis of the driver, analysis of in-vehicle IMU data, etc.), and any other suitable events. Near-collision events can be detected based on vehicle kinematics information (e.g., rapid deceleration or route change), acoustics (e.g., screeching tires), vehicle proximity information (e.g., when an obstacle is within a threshold distance of the vehicle), a volumetric collision probability map (e.g., using a method such as that described in U.S. application Ser. No. 15/892,899 filed 9 Feb. 2018, incorporated herein in its entirety by this reference; alternatively using another method), or otherwise detected.

In relation to Block S110, a vehicle event is preferably detected based on signals sampled by sensors on-board the vehicle (e.g., onboard vehicle system sensors, auxiliary system sensors, vehicle sensors, proximity sensors, etc.), vehicle parameters (e.g., acceleration pedal position, steering wheel position, brake position, etc.), external vehicle sensor signals, or based on any other suitable measurement, using pattern matching (e.g., wherein the sensor signal pattern matches a pattern associated with a vehicle event of any suitable type), neural networks, rules, or using any other suitable methodology or technique. For example, the near-collision event can be detected when a deceleration spike is detected in the kinematic sensor measurements, when a surprised, scared, or other suitable driver expression is detected from an interior-facing camera stream, when a kinematic pattern substantially matches a "swerving" pattern (e.g., based on the vehicle's sensors, such as brake pedal position; based on the system's accelerometer, gyroscope, or IMU measurements indicating a G-force exceeding a predetermined threshold; based on images recorded by the recording system; the lateral acceleration exceeds a threshold acceleration; etc.), when the brakes are suddenly applied, when an object or agent occupies more than a threshold proportion of an external-facing camera's field of view, when screeching is detected (e.g., from an audio sensor or microphone), when a collision is detected (e.g., wherein the sensor data sampled before the collision time is associated with a near-collision event; wherein a collision is detected in response to the measured G-force exceeding a collision threshold, in response to the acoustic pattern substantially matching a collision pattern, in response to the airbags deploying, or otherwise determined), or when any other suitable condition associated with a vehicle event is detected.

Block S110 can include determining a rare vehicle event (e.g., that a rare vehicle event is depicted by captured sensor signals), wherein a rare vehicle event includes a vehicle event having an occurrence probability below a threshold probability (e.g., that occurs rarely). The occurrence probability is preferably calculated based on a vehicle event dataset corresponding to a population of vehicles (e.g., collected as described above), but can additionally or alternatively be retrieved from a lookup table (e.g., a table of vehicle event probabilities categorized by vehicle event type), determined based on the novelty of the vehicle event data (e.g., wherein no such vehicle event data or no similar vehicle event data can be found in the existing vehicle event dataset, wherein the vehicle event data corresponds to a heretofore unobserved vehicle event, etc.), and/or otherwise suitably determined.

In a variation, Block S100 can include tagging the sensor signals (e.g., image data) with the event type (e.g., determined in accordance with one or more variations of Block S110). In this variation, Block S100 preferably results in tagged sensor signals (e.g., tagged image data), which can be provided to a third party in one or more variations of portions of the method 100.

In a specific example, Block S100 includes determining that a rare vehicle event occurred within a time interval of image sequence capture, and transmitting the image sequence to a remote computing system in communication with the onboard vehicle system, in response to determining that the rare vehicle event occurred. In this specific example, subsequent portions of the method can be performed at the remote computing system; however, in further examples, subsequent portions of the method can be performed at the onboard vehicle system, the remote computing system, and/or any other suitable location. In a related example, Block S100 can include determining an event type of the rare vehicle event.

Determining external object parameters S200 functions to extract object parameter values from the sampled signals, such that virtual representations of the objects can be populated in the virtual environmental reconstruction. S200 can include determining a set of agent parameters, wherein the external object is an agent as described above. S200 can include extracting, computing, deriving, and/or otherwise suitable determining the object parameters (e.g., agent parameters). S200 can be performed by one or more analysis modules, such as those described above, or by any other suitable system or component(s) thereof. The external objects can include: static objects (e.g., road, sidewalk, buildings, street signs, etc.), mobile objects (e.g., driver, passengers, vehicle cabin features, vehicles, pedestrians, transient signage, etc.), or any other suitable set of objects. The objects can be rigid (e.g., with a static geometry), substantially rigid (e.g., appear static when viewed from a distance, predominantly static other than superficial portions that may deform slightly, etc.), deformable, or have any suitable geometry. The object parameters preferably include the object pose, including the object orientation (e.g., whether the object is facing toward or away from the onboard vehicle system), the object position (e.g., angle and distance relative to the onboard vehicle system). However, the object parameters can additionally or alternatively include: the object location within the sampled signal (e.g., the bounding box encompassing the object), the object class (e.g., object label), the object geometry, the object kinematics (e.g., acceleration, velocity, traversal path, etc.), object numerosity, object state (e.g., whether a traffic light is red, green, or yellow), or include any other suitable parameter. The object parameters can be defined absolutely (e.g., relative to the frame of the external scene), relative to the sensor, or have any suitable frame of reference. The object parameters can be extracted from the sampled signals (e.g., images, video), the time of day, ambient environment parameters (lighting, light angle, rain, fog, etc.; determined from the sampled signals, retrieved from a remote database for that time and location, etc.), vehicle parameters (e.g., determined from the sampled signals, received from vehicle, etc.), or from any other suitable set of data.

The data used for analysis can be: all data sampled during a driving session (e.g., session of substantially continuous vehicle operation, from initiation to termination), data sampled within a sliding window (e.g., wherein samples outside of the window are discarded, stored, or otherwise managed; wherein the sliding window is relative to an event time, the current time, or another reference time), a sample sequence, a single sample, or include any suitable set of sensor samples. The sensor samples used for analysis can be sampled by onboard vehicle system(s) on a single vehicle, a plurality of vehicles (e.g., all vehicles within a predetermined distance or geofence from a given reference point, such as a single vehicle's location), or by any other suitable system. S200 can be performed in real time (e.g., as the sensor signals are recorded), when an analysis event occurs, asynchronously, or at any suitable time. The analysis event can be a user request for analysis, modeling, or any other suitable request; sensor parameter values satisfying a predetermined set of conditions (e.g., substantially matching a predetermined pattern, exceeding or falling below a threshold value, etc.) indicative of an accident, near miss, distraction event, or be any other suitable event.

In a variation, Block S200 includes extracting a set of agent parameters from image data. In this variation, Block S200 is preferably performed at a remote computing system, but can additionally or alternatively be performed at any other suitable location. In this variation, the set of agent parameters defines: an agent identifier, an agent position, and an agent pose; however, the set of agent parameters can additionally or alternatively define any suitable parameters in relation to agents (e.g., objects) depicted by the image data. In a specific example of this variation, the agent identifier, the agent position, and the agent pose are extracted from the image data in parallel. In this variation and related variations, the agent identifier can include personally identifying information (PII), which can include: recognizable facial features (e.g., in image data), VIN numbers, license plate numbers, and any other data extractable from the image data from which an individual can be identified.

Block S200 can include anonymizing the agent parameters, which functions to remove PII from the captured sensor signals (e.g., image data) during extraction of the agent parameters from which the virtual model is generated (e.g., as in one or more variations of Block S300). In a specific example, the set of agent parameters defines an agent identifier, wherein the agent identifier includes PII, and Block S200 includes processing an image sequence at an agent classifier, wherein the agent classifier extracts the agent identifier, and deleting the PII from the set of agent parameters (e.g., prior to Block S300), thereby anonymizing the virtual model.

Block S200 preferably includes: detecting an object (e.g., agent) based on the sensor signal S210 and determining a pose for the detected object (e.g., agent) from the sensor signal S220. S200 can additionally or alternatively include: determining the object geometry from the sensor signal, converting the object parameters into world coordinates, or any other suitable process.

Detecting an object within the sensor signal S210 functions to identify the signal segments associated with an object, and can optionally classify the object projected within the signal. The object classification can be a general class (e.g., vehicles), specific classification, a pose label, or be any other suitable classification and/or subclassification. The object is preferably detected from the image or video, but can alternatively be detected from a combination of the image and an auxiliary sensor signal (e.g., rangefinding signal), from the auxiliary sensor only, or from any suitable source. The object is preferably detected with a set of analysis modules, but can be detected with any other suitable system. The analysis modules can be global, selected based on the sampling context (e.g., pedestrian and stop sign modules are excluded when the GPS indicates that the vehicle is on the highway; a nighttime module is used when the ambient light sensor indicates that the ambient light is below a threshold level); randomly selected, or otherwise determined. Detecting the object can include applying: image segmentation (e.g., foreground/background segmentation), feature detection (e.g., edge, corner, blob, SIFT, SURF, or other feature detector), or any other suitable image processing technique.

In one variation, S210 includes detecting a deviation, in a segment of the external scene, from a reference map of the static environment based on a rangefinding signal; identifying the image region associated with the segment; and classifying the object using a classifier.

In a second variation, S210 includes detecting the object from the image or video. In a first embodiment, S210 includes applying an Adaboost detector with an ensemble classifier of efficient features, then performing a sliding window search having cascaded classifiers to the image(s). In a second embodiment, S210 includes applying a DPM method (e.g., using a HOG window template matching technique), then performing an exhaustive search (e.g., for possible locations, scales, and aspect ratios), coarse-to-fine search, branch and bound approach, cross talk approach, or any other suitable search. In a third embodiment, S210 includes applying spatial pyramid matching of bag-of-words models adopted for detection. In a fourth embodiment, S210 includes identifying an image segment with a high probability of encompassing an object projection, and classifying the object within the image segment. The image segment can be identified using foreground/background segmentation, blob detection, base feature extraction and aggregation (e.g., based on stable relative positions within the image and/or across sequential images, using a bottom-up method, etc.), a bounding box regressor, or any other suitable method. The object classification can use a selective search of segmentation cues, exhaustive search, or any other suitable classification method. In a fifth variation, S210 includes applying a set of trained neural networks (e.g., each trained to identify an object class) to the image. The neural network can be a convolutional neural network trained using support vector machine(s) and historic or crowdsourced images, can be any other suitable neural network. In a sixth variation, 210 includes: determining the vehicle location within the 3D external scene (e.g., geographic vehicle location); determining the vehicle orientation within the scene; determining a 2D projection of the static external scene (e.g., from a virtual reference map), given the vehicle location, vehicle orientation, and the known onboard vehicle system orientation relative to the vehicle; aligning the image with the expected 2D projection; and identifying deviations between the image and expected 2D projection as potential objects. The potential objects can then be classified (e.g., using a single classifier, cascading classifiers, etc.). However, the object can be otherwise detected.

Determining a pose for the detected object from the sensor signal S220 functions to determine the object's position and/or orientation relative to the onboard vehicle system. S220 can be performed concurrently with S210 (e.g., wherein the detectors are for a given object's pose, not for a given object generally), serially with S210, or performed at any suitable time.

The pose is preferably determined from the same image used to detect the object, but can be determined from an image temporally adjacent the object detection image, an image substantially concurrently recorded with the object detection image, or be determined from any suitable sensor signal. In one variation, both the object position and orientation are determined from the image. In a second variation, the object position is determined from active sensor measurements (e.g., radar, LIDAR, etc.), and the object orientation is determined from the image and/or determined object position. However, any suitable set of measurements can be used for object pose determination.

Figure 5:
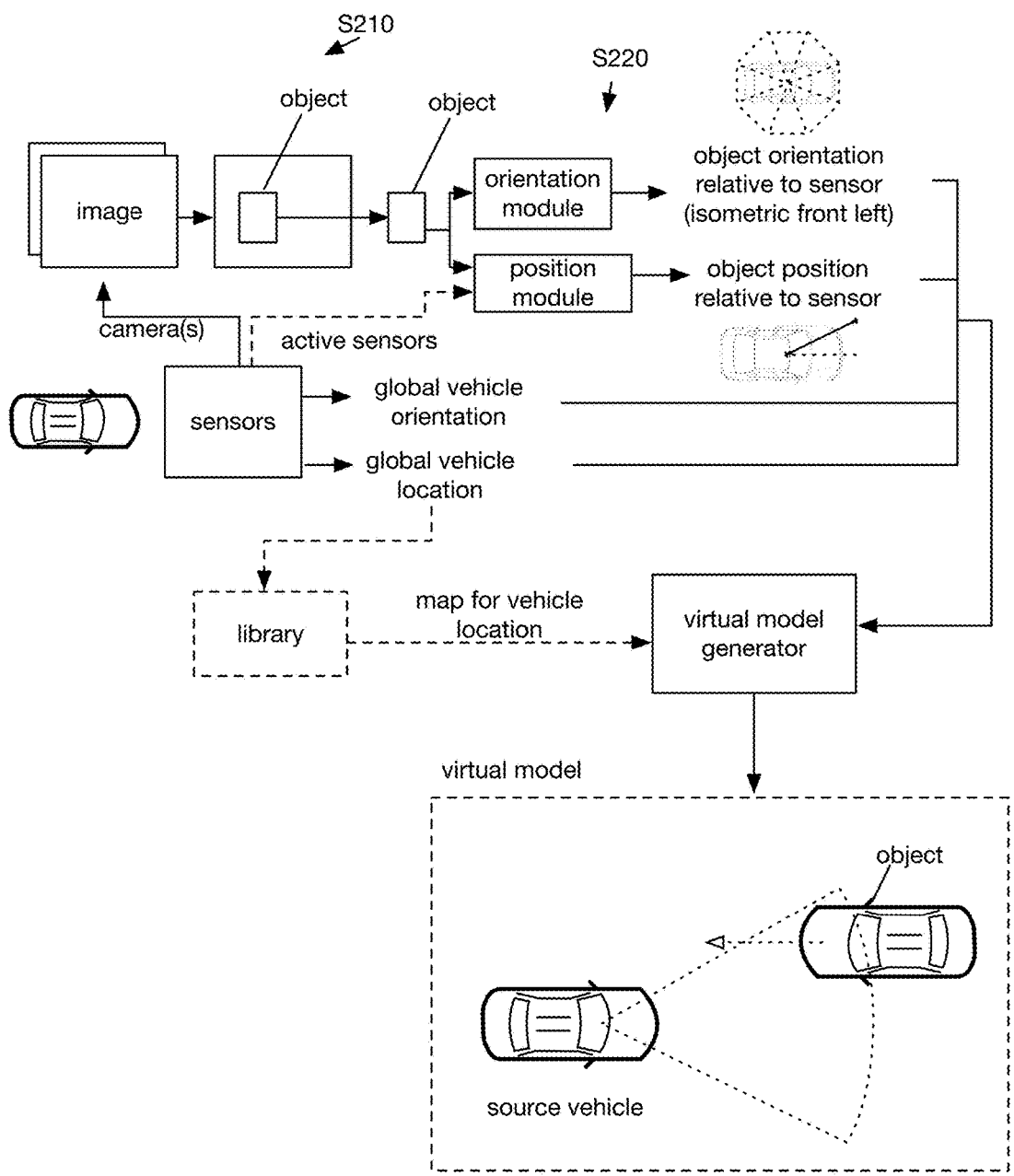
FIG. 5 is a schematic representation of virtual representation generation.
Figure 9:
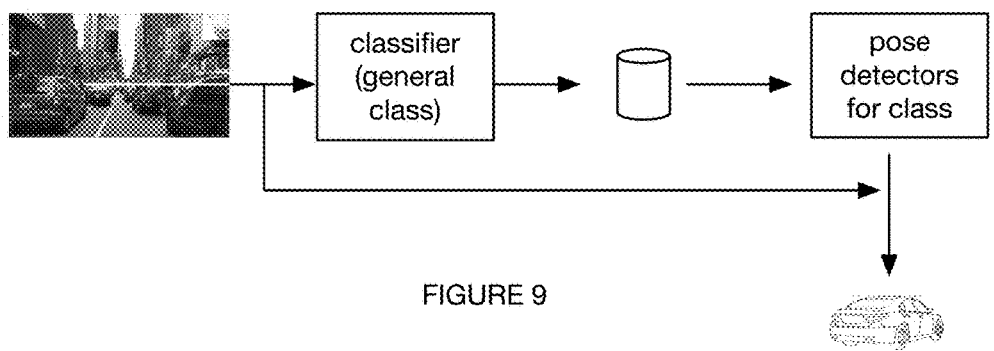
Figure 10:
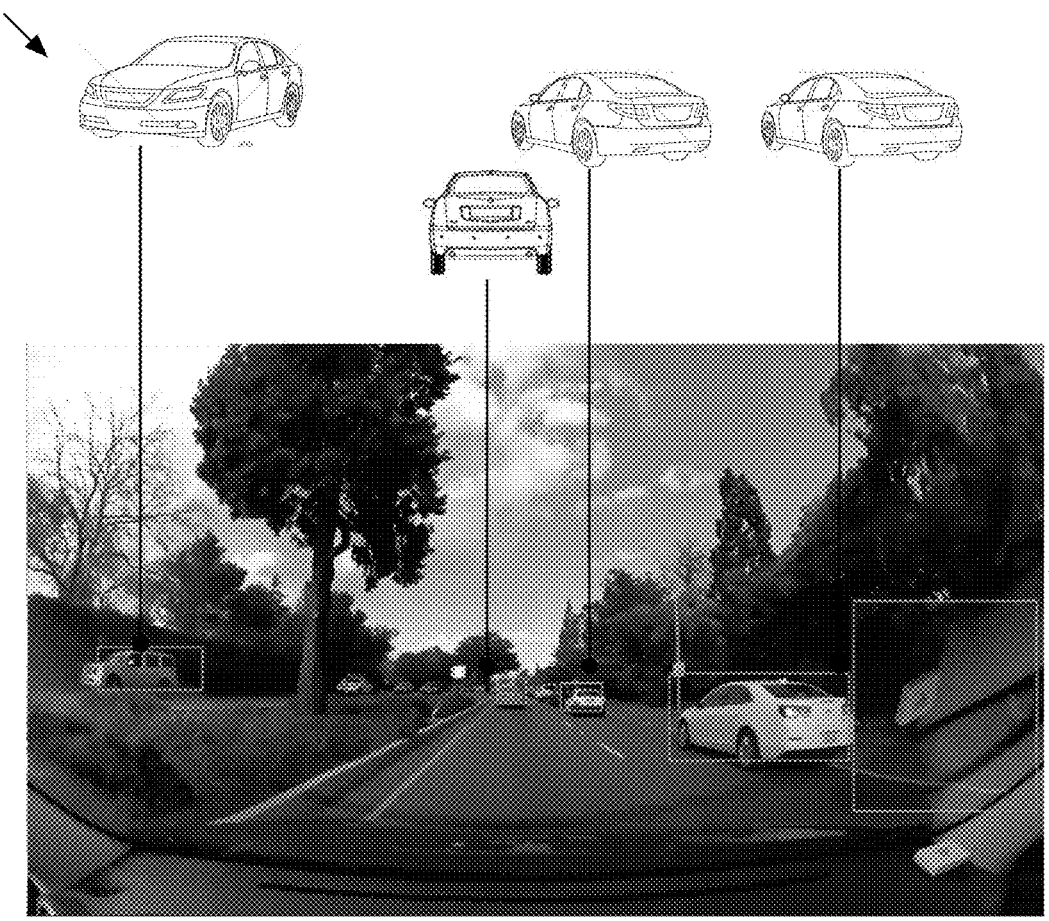
FIG. 10 is an example of object orientation determination for a given image.
Figure 11:
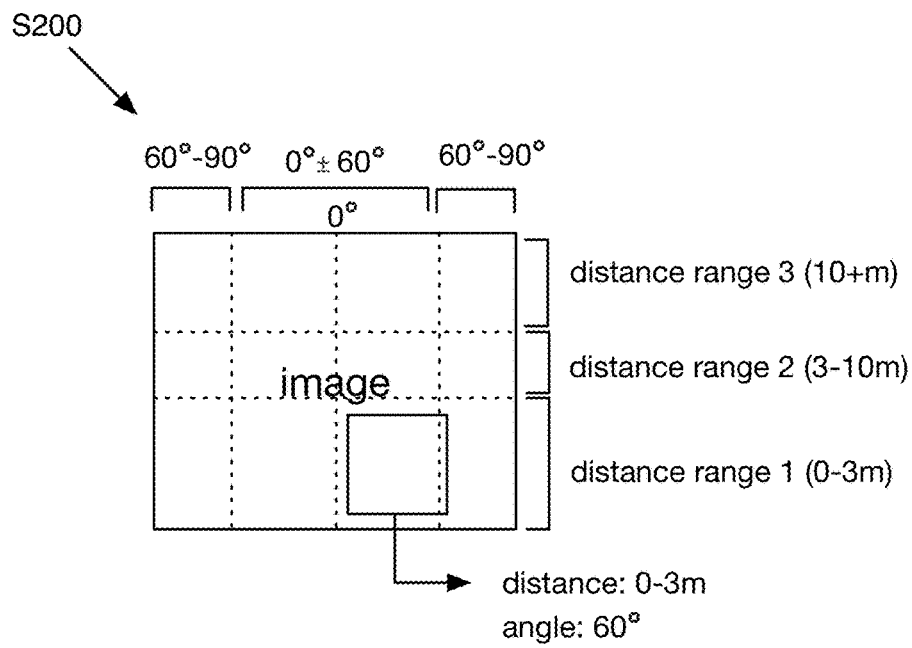
FIGS. 11 and 12 are examples of object position determination.
Figure 12:
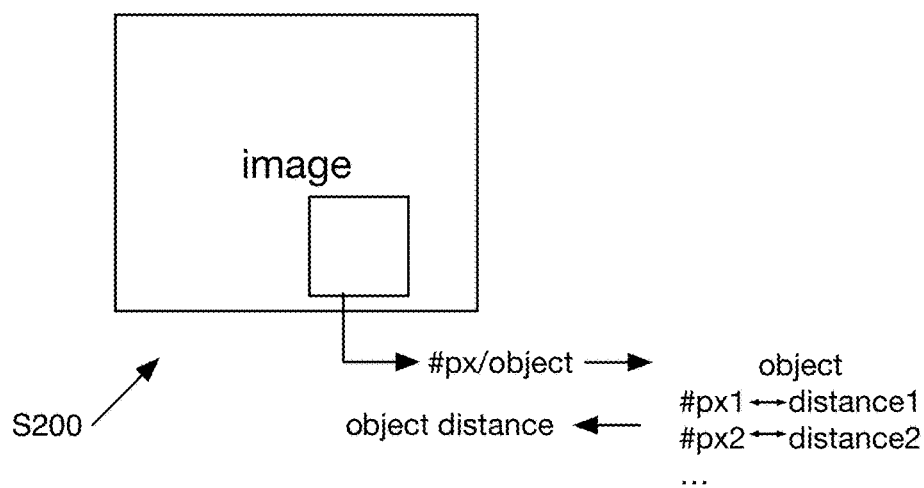

In a first variation, the same pose detector (e.g., pose classifier) can determine both the object position and orientation. In the first variation, the pose classifier and position classifier can be combined into a single classifier. In a second variation, different analysis modules can determine the object position and orientation (example shown in FIG. 5), such as a position classifier and a pose classifier, respectively. For example, the object position can be determined based on: the portion of the image frame encompassing the object projection (example shown in FIG. 11); the pixels forming the object projection; the pixel distance from a vehicle reference point (e.g., hood ornament); the number of pixels forming the object projection, a known object size, and a distance mapping between the number of pixels and the object size (example shown in FIG. 12); the object proximity to a landmark, or other locally unique feature having a known physical location, within the image; images of the same object captured by onboard vehicle system and/or vehicles with known positions and orientations; or otherwise determined, while the object pose can be determined using a classifier or other analysis module. In a third variation, different pose detectors can determine the object distance, the object angle, and the object orientation. In a fourth variation, different orientation detectors can determine the probability of the object being in the respective orientation, wherein the orientation with the highest probability can be selected as the object orientation (example shown in FIG. 9). However, any suitable number of pose detectors can be used in any suitable combination to determine the object pose.

The number of identifiable poses can be limited or infinite (e.g., a continuous distribution). In one example shown in FIG. 4, the number of detected object orientations can be limited to six orientations: front, back, left, right, isometric front right, isometric front left, isometric back right, isometric back left. Each orientation can be associated with an error threshold, Gaussian distribution, orientation range, or other suitable resolution. In a second example, the determined object distances can be specific distances (e.g., 5.2 m), distance ranges (e.g., between 0-1 m, 1-5 m, 5-10 m, 10-20 m, etc.), or have any other suitable resolution.

In a first variation, the object pose can be determined using analytic or geometric methods. This variation can include: retrieving a predetermined virtual model for the object (virtual object model) based on the object label determined in S210, identifying control points on the virtual object model and the object projection in the image, and resolving the pose transformation based on the relationship between the control point positions (e.g., using point set registration algorithms).

In a second variation, the object pose can be determined using a parameter optimization technique (e.g., a genetic algorithm, a nonlinear optimization, a linear optimization, etc.). In this variation, the reference virtual object model used in the parameter optimization can be retrieved based on the object label determined in S210 or otherwise determined.

Figure 6:
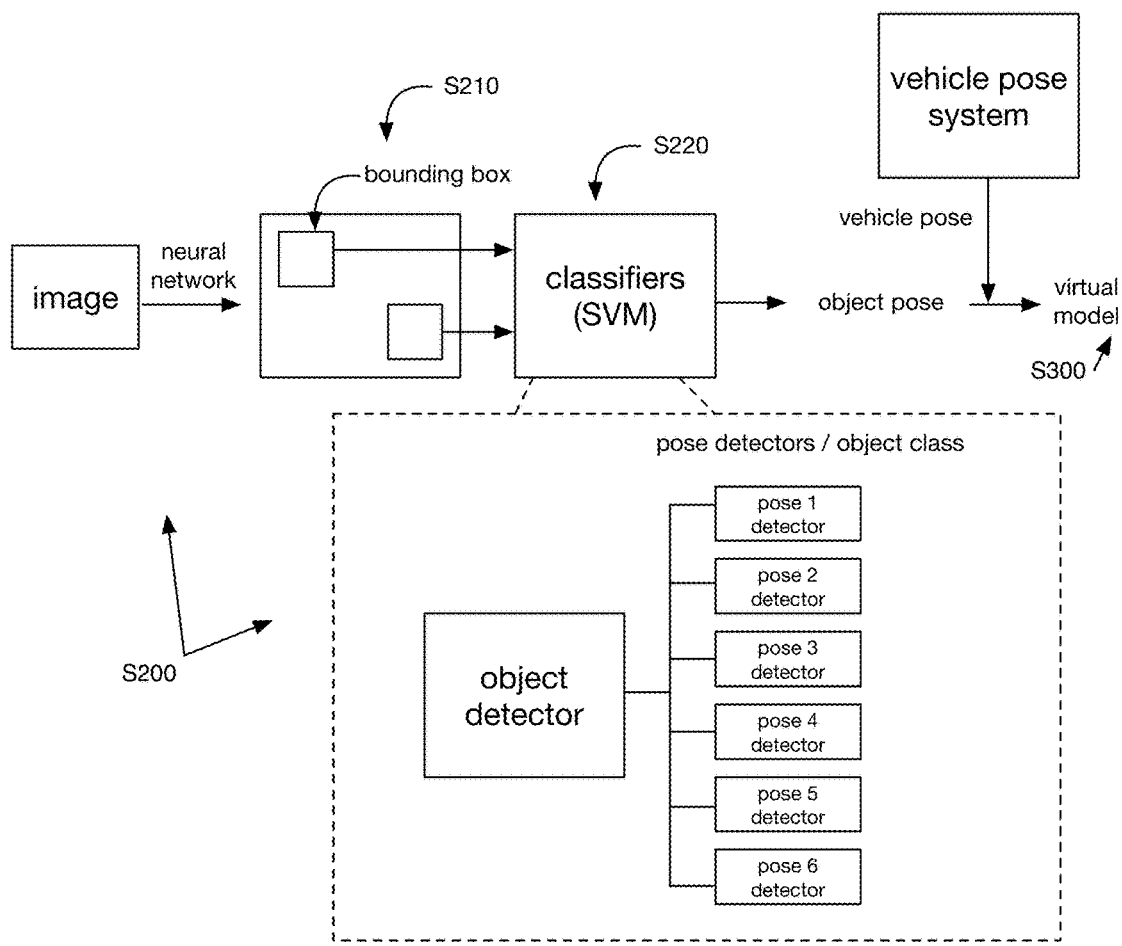
FIG. 6 is a schematic representation of the set of modules used to determine the virtual representation.
Figure 7:
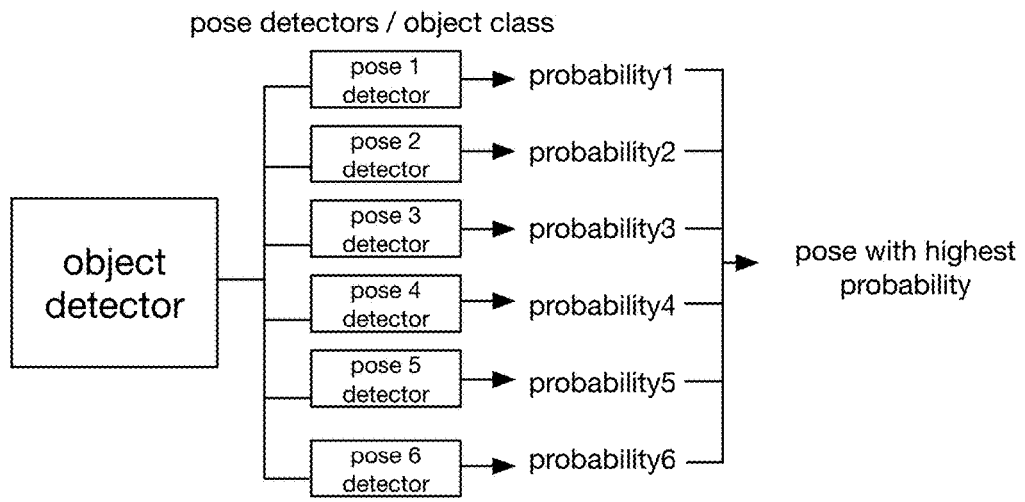
FIG. 7 is a schematic representation of an example of determining the object pose.

In a third variation, the object pose can be determined using learning-based methods (e.g., trained on a set of images of the object in different poses). For example, S220 can use an SVM classifier, a neural network (e.g., CNN), or any other suitable classifier. In a specific example (shown in FIG. 6), the method can include using a CNN to identify bounding boxes for potential objects, using a detector to determine the object class (e.g., human, vehicle, landmark, dog, etc.), using a SVM classifier to determine the object pose.

Figure 8:
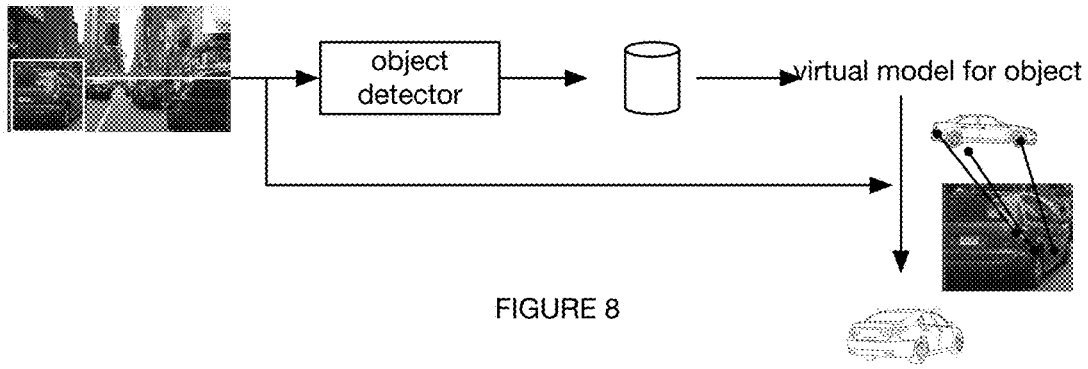
FIGS. 8 and 9 are examples of object orientation determination.

In a fourth variation, the object pose can be determined by identifying features of the object in the image, then comparing the features to a feature database for the object (example shown in FIG. 8). The feature database can be selected and/or be specific to the object class determined in S210, or be otherwise related to the object.

S200 can optionally include determining the object geometry from the sensor signal, which functions to adjust, verify, obtain, retrieve or otherwise determine the object geometry. The object geometry can be determined before S210 or S220, concurrently with S210 or S220, after S210 or S220 (e.g., using the outputs of S210 or S220), or at any suitable time. The object geometry can be determined by a geometry analysis module, more preferably a geometry analysis module specific to the object class, but can be determined by any other suitable analysis module. The object geometry can be determined from the same image used to detect the object, but can be determined from an image temporally adjacent the object detection image, an image substantially concurrently recorded with the object detection image, or be determined from any suitable sensor signal. In one variation, the object geometry is retrieved from a library of stock object geometries, based on the object class determined in S210. In a second variation, the object geometry is determined by applying structure from motion methods to the video. Examples of SFM methods that can be applied include: monocular SFM (e.g., incremental, global, out of core, etc.); feature tracking across multiple images to reconstruct the object 3D positions (e.g., using feature matching such as Lukas-Kanade tracking, between images); direct approaches; or any other suitable method. In a third variation, the object geometry is determined using monocular cues methods, such as shape-from-x methods, shape-from-shading methods (e.g., wherein the lighting angle can be determined from ambient light sensors, weather databases, or other data sources), photometric stereo, shape-from-texture methods, or any other suitable monocular cue method.

In variations, Block S200 can optionally include determining the object kinematics, which functions to determine the object's trajectory. In such variations, Block S200 can include determining an agent trajectory (e.g., as a portion of extracting the set of agent parameters). The object trajectory can be used for vehicle path planning, used to determine an expected object physical location and/or position in a subsequent image frame, included in the virtual reconstruction (e.g., wherein the virtual reconstruction includes a virtual time series), or otherwise used. The object kinematics can be determined by an analysis module (e.g., executing on the remote computing system or onboard vehicle system), an application specific integrated circuit (e.g., vision chip, GPU, TPU, VPU, etc.), any suitable processing unit configured to execute instructions to determine object kinematics (e.g., CPU, GPU, etc.), or by any other suitable system. The object kinematics can be determined from the same image used to detect the object, an image temporally adjacent the object detection image, an image substantially concurrently recorded with the object detection image, historic object positions and/or kinematic values (e.g., wherein the object velocity can be estimated based on past object acceleration), the determined object pose (e.g., wherein a first trajectory has a higher probability of being the actual trajectory, based on the object pose), or be determined from any suitable sensor signal or data. Object kinematics can include: object velocity, acceleration, jitter, or any other suitable kinematic parameter. The object kinematics can be determined by applying: optical flow methods (e.g., Lucas-Kanade, Horn, Schnuck, Buxton-Buxton, Black-Jepson, variational methods, discrete optimization methods, neuromorphic techniques, etc.), direct motion estimation (e.g., block-matching, phase correlation, pixel recursive methods), indirect motion estimation, particle image velocimetry, or any other suitable method.

In a specific example, Block S200 includes extracting a set of agent parameters from the image sequence at a remote computing system, wherein the set of agent parameters defines an agent position, an agent pose, and an agent trajectory. In this specific example, extracting the set of agent parameters includes simultaneously processing the image sequence at a position classifier and a pose classifier (e.g., wherein the position and pose classifiers are distinct classifiers). In this example, the position classifier extracts the agent position relative to a camera from each frame of the set of frames by classifying the detected object (e.g., the agent) by relative position, and the pose classifier extracts the agent pose relative to a camera from each frame of the set of frames, by classifying the detected object (e.g., the agent) into one of a finite set of angular positions (e.g., orientations, poses, etc.). In this example, a trajectory estimator (e.g., an analysis module for determining object kinematics as described above) processes each frame of the set of frames, the agent position corresponding to each frame, and the agent pose corresponding to each frame to generate the agent trajectory.

In a related specific example, the position classifier includes a first convolutional neural network (CNN), and the pose classifier includes a second CNN. Each of the first and second CNNs are preferably trained substantially as described above (e.g., on a corpus of vehicle event data, on a labeled training set of vehicle positions and poses, etc.), but can be otherwise suitable generated.

Figure 15:
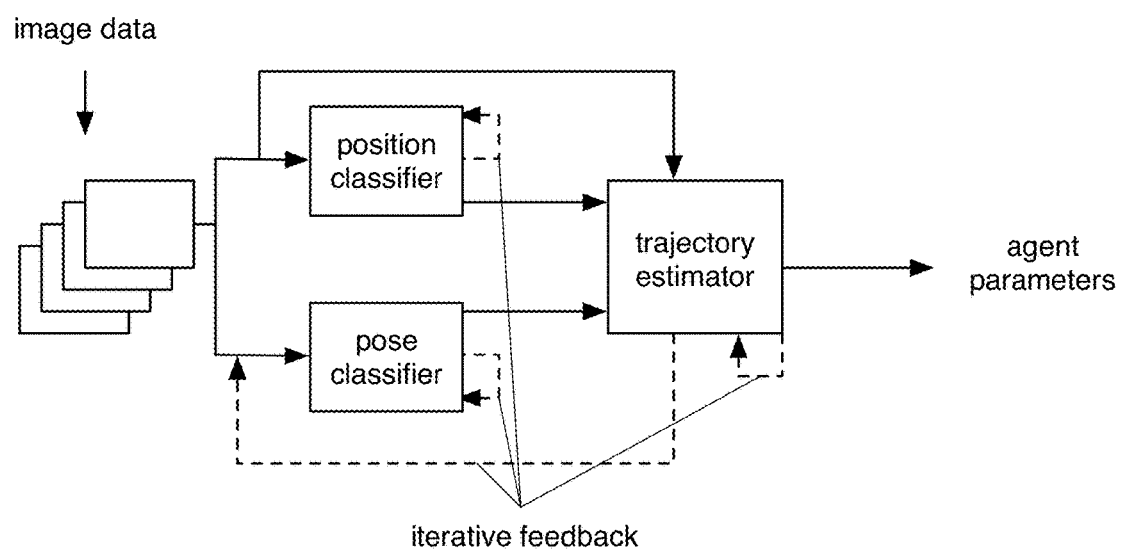
FIG. 15 depicts an example implementation of a portion of the method.

Block S200 can optionally include iteratively extracting the agent parameters. For example, image data can be passed iteratively between a set of analysis modules over multiple iterations, and for each iteration subsequent to a first iteration, extracting can include simultaneously processing each frame and the agent position at each frame at the position classifier and processing each frame and the agent pose at each frame at the pose classifier. In this example, the output of the pose classifier and the position classifier (e.g., the agent position corresponding to each frame and the agent pose corresponding to each frame) and the output of the trajectory estimator (e.g. the agent trajectory) can be processed at the trajectory estimator in an iterative feedback loop (e.g., as shown in FIG. 15). Convergence of the iterations can be determined in any suitable manner (e.g., when the difference between the current iteration and the previous iteration falls below a convergence threshold, an accuracy threshold, a precision threshold, etc.).

S200 can optionally include verifying the object parameters (e.g., location, orientation, class, etc.) with a sensor signal (e.g., image) recorded by a second onboard vehicle system. The second onboard vehicle system is preferably mounted to a separate vehicle and/or recording the scene from a different viewing angle, but can alternatively be otherwise situated relative to the first onboard vehicle system. In one example, verifying the object parameters includes: identifying, from a plurality of images, a second image of the scene recorded by a second onboard vehicle system within a predetermined time window of the first image; identifying a segment of the second image associated with the obstacle location, as determined from the first image; running the detector(s) on the segment; and verifying the object parameters when the object parameter values output by the detector substantially matches the expected object parameters determined from the first image (e.g., based on the relative positions of the onboard vehicle systems, etc.). The second system can be within a geofence from the first system, be identified in an image recorded by the first system, be communicatively connected to the first system, or be otherwise related to the first system. The detector(s) can be the same or different detector(s) used to determine the object parameters. For example, the detector can be for the class of object detected in the first image; be for the expected pose of the object detected in the first image, wherein the expected pose is determined from the relative position of the second onboard vehicle system relative to the first onboard vehicle system and the object pose relative to the first onboard vehicle system; or be any other suitable detector. In a second example, verifying the object kinematics includes: estimating an expected future object pose based on the determined object pose and kinematics, tracking the object through one or more subsequent frames, and verifying the determined object pose and kinematics in response to the subsequently-determined object pose (determined from the subsequent frames) substantially matching the expected object pose (e.g., within an error threshold). Additionally or alternatively, the determined object pose and kinematics can be used to estimate the bounding box position for the object in a subsequent frame. However, the object parameters can be otherwise validated.

Figure 13:
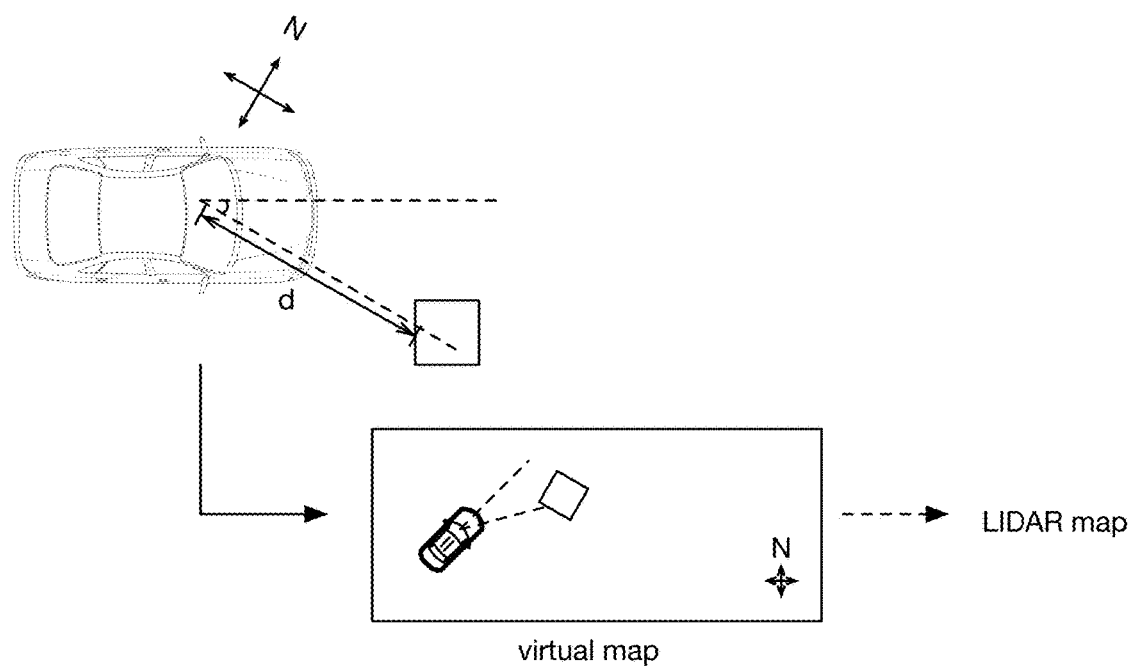
FIG. 13 is an example of converting the object parameters into world coordinates.

S200 can optionally include converting the object parameters into world coordinates (global coordinates), which functions to position the objects within the virtual representation of the physical region (example shown in FIG. 13). Converting the object parameters into world coordinates can include: determining the onboard vehicle system's location and pose relative to the world coordinates; and converting the object parameters into world coordinates based on the onboard vehicle system's location, onboard vehicle system's pose, and a predetermined conversion map (e.g., manually determined, automatically learned, or otherwise determined). The onboard vehicle system's location can be determined using: landmark identification and trilateration, high-resolution location systems (e.g., GPS-RTK, 5G node trilateration, etc.), or any other suitable method. The onboard vehicle system's pose can be determined using: orientation sensor data (e.g., compass data, magnetometer data, accelerometer data, altimeter data, etc.), optical analysis (e.g., horizon identification and characterization, etc.), or any other suitable method. However, the object parameters can be otherwise converted.

Generating the virtual model of the environment S300 functions to generate a virtual representation of the environment, which can be used by auxiliary onboard vehicle systems (e.g., for navigation), claims analysis (e.g., for insurance purposes), or otherwise used. The virtual model can be 2D, 3D, a virtual video, matrix, or have any suitable dimensionality. The virtual model preferably includes virtual representations of the static environmental features and the mobile objects (e.g., detected in S200), but can additionally or alternatively include a virtual representation of any other suitable object. Block S300 can include combining the set of agent parameters into a datafile (e.g., wherein the datafile can be used to reconstitute a virtual model, wherein the datafile is identical to the virtual model, etc.).

In a first variation, S300 includes retrieving a predetermined virtual model of environment including static environmental features based on vehicle and/or onboard vehicle system location; determining a 2D projection of the virtual model based on the onboard vehicle system pose; comparing the 2D projection with an image recorded by the onboard vehicle system (e.g., matching a feature between the 3D virtual model or 2D projection to a feature in the image); and, in response to the comparison constituting a good match (e.g., determined based on a consistency function, etc.), aligning the onboard vehicle system coordinates to virtual reference coordinates to orient the detected object within the virtual model based on coordinate alignment. The virtual object representation in the 3D virtual model can be a virtual object model retrieved from the library, a virtual model having an object geometry determined from the sensor data, or be any suitable virtual representation of the object. In this variation, Block S300 can include retrieving a map (e.g., generated by away of a previous driving session implementing one or more variations of the method 100) that includes static object data, and generating the model based on the retrieved static object data in combination with extracted agent parameters. Metadata, such as the object kinematic parameters (e.g., vector, magnitude) or source data (e.g., video, images, audio), can optionally be associated with the virtual object representation or resultant 3D virtual model.

In a second variation, S300 includes generating a new virtual model from the image(s), based on the object geometries extracted from the image(s) and the relative positions of each object appearing within the image(s). A new virtual model can be generated from the extracted set of agent parameters, a perturbed set of agent parameters (e.g., wherein the new virtual model can be a perturbed virtual model), and/or otherwise suitably generated.

Block S300 can optionally include perturbing the agent parameters and generating a virtual model based on the perturbed parameters.

Block S300 can be automatically performed in response to extraction of agent parameters (e.g., in accordance with one or more variations of Block S200), and/or in response to a trigger (e.g., receipt of an event type request).

Block S300 can include generating a perturbed set of agent parameters (e.g., perturbing the set of agent parameters, resulting in perturbed parameters). In a variation, generating each perturbed parameter includes randomly sampling a distribution function (e.g., a gaussian distribution, a non-gaussian distribution, etc.) to generate the perturbed parameter. The distribution function can have a center value corresponding to the original value (e.g., of the agent parameter), such that the mean value of random sampling corresponds to the original parameter value; however, the distribution function can additionally or alternatively have any suitable center value.

The method can optionally include translating the resultant virtual model into data readable by a secondary system. The secondary system can be a range finding system (e.g., TOF, LIDAR, stereocamera, etc.), navigation system (e.g., wherein the virtual model is used for path planning and/or vehicle navigation through the physical space), or be any other suitable system. The virtual model can be converted into a vector space, point cloud, or any other suitable virtual representation. The virtual model can be converted using a transformation, a map, or using any other suitable conversion method. Translating the virtual model is preferably performed by a translation module as described above, but can additionally or alternatively be performed by any other suitable component or subsystem. The conversion basis (e.g., transformation, map, etc.) can be manually defined, automatically learned, or otherwise determined.

In a variation of the above, generating the set of perturbed parameters can include transforming the set of agent parameters based on a single parameter (e.g., a noise parameter) that modifies the set of agent parameters in a unitary manner (e.g., applies a single transformation to all the agent parameters). For example, transforming the set of agent parameters based on the noise parameter can include simulating sensor noise based on a model of sensor performance, and transforming the set of agent parameters to emulate the performance of the sensor. The model of sensor performance can include weather effects, lighting effects, and any other suitable effects of the environment on the sensor. The sensor model can be a model of a range finding sensor (e.g., a LIDAR sensor), an imaging sensor (e.g., a stereo camera, a monocular camera, etc.), and of any other suitable sensor.

However, Block S300 can be otherwise performed.

The method 100 can optionally include receiving a request (e.g., from a computing system, from a user, from a web server, etc.). For example, the method 100 can include receiving an event data request from a user system, wherein the event data request corresponds to the event type of the rare vehicle event.

The method can optionally include providing data to a third party. For example, the method can include providing the virtual model (e.g., generated as described above) to a vehicle controller. The vehicle controller in this example can be configured to generate vehicle control instructions based on the virtual model (e.g., by simulating vehicle performance in the environment reconstructed by the virtual model). In a related example, the method can include receiving an event type request from the vehicle controller prior to providing the virtual model to the vehicle controller, wherein the event type request corresponds to the event type of a rare vehicle event, and providing the virtual model to the vehicle controller in response to receiving the event type request. In an example of the method wherein the set of agent parameters is packaged into a datafile, the method can include providing the datafile to the user system in response to the event data request. However, the method can additionally or alternatively include receiving any suitable request, and responding in any suitable manner.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for digital environment reconstruction, comprising:
   capturing an image sequence within a time interval using a monocular camera of an onboard vehicle system rigidly mounted to a vehicle, wherein the image sequence depicts an exterior environment of the vehicle, and wherein the image sequence defines a set of frames;

determining that a rare vehicle event occurred within the time interval;

transmitting the image sequence to a remote computing system in communication with the onboard vehicle system, in response to determining that the rare vehicle event occurred;

extracting a set of agent parameters from the image sequence at the remote computing system, wherein the set of agent parameters defines an agent position, an agent pose, and an agent trajectory of an agent in the exterior environment, wherein extracting comprises:

simultaneously processing the image sequence at a position classifier and a pose classifier, wherein the position classifier extracts the agent position relative to the monocular camera from each frame of the set of frames, and wherein the pose classifier extracts the agent pose relative to the monocular camera from each frame of the set of frames, and processing each frame of the set of frames, the agent position corresponding to each frame, and the agent pose corresponding to each frame at a trajectory estimator to generate the agent trajectory;

generating a virtual model of the exterior environment of the vehicle based on the set of agent parameters;

providing the virtual model to a vehicle controller, wherein the vehicle controller is configured to generate vehicle control instructions based on the virtual model.

2. The method of claim 1, wherein the position classifier comprises a first convolutional neural network (CNN), and wherein the pose classifier comprises a second CNN.

3. The method of claim 1, wherein determining the rare vehicle event occurred within the time interval comprises:
determining a vehicle event based on the image sequence;
computing a probability associated with the vehicle event; and
determining the rare vehicle event occurred based on a threshold probability exceeding the probability associated with the vehicle event.

4. The method of claim 1, wherein the set of agent parameters defines an agent identifier, wherein the agent identifier comprises personally identifying information (PII), and wherein extracting the set of agent parameters further comprises:
processing the image sequence at an agent classifier, wherein the agent classifier extracts the agent identifier, and
deleting the PII from the set of agent parameters prior to generating the virtual model, thereby anonymizing the virtual model.

5. The method of claim 1, wherein extracting the agent parameters is performed iteratively, and wherein, for each iteration subsequent to a first iteration, extracting comprises:
simultaneously 1) processing each frame and the agent position at each frame at the position classifier and 2) processing each frame and the agent pose at each frame at the pose classifier, and
processing each frame, the agent position corresponding to each frame, the agent pose corresponding to each frame, and the agent trajectory at the trajectory estimator.

6. The method of claim 1, further comprising:
determining an event class of the rare vehicle event,
receiving an event class request from the vehicle controller prior to providing the virtual model to the vehicle controller, wherein the event class request corresponds to the event class of the rare vehicle event, and
providing the virtual model to the vehicle controller in response to receiving the event class request.

7. The method of claim 6, further comprising, in response to the event class request: generating a set of perturbed parameters based on the set of agent parameters, generating a perturbed virtual model based on the set of perturbed parameters, and providing the perturbed virtual model to the vehicle controller.

8. The method of claim 7, wherein each of the set of agent parameters defines a parameter value, and wherein generating each perturbed parameter of the set of perturbed parameters comprises:
randomly sampling a gaussian distribution to generate the perturbed parameter, wherein the gaussian distribution is centered at the parameter value of an agent parameter of the set of agent parameters.

9. A method for digital environment reconstruction, comprising:
capturing image data using a camera of an onboard vehicle system rigidly mounted to a vehicle, wherein the image data depicts an exterior environment of the vehicle;
determining that a rare vehicle event is depicted by the image data, determining an event class of the rare vehicle event, and tagging the image data with the event class to generate tagged image data;
extracting a set of agent parameters from the image data at a remote computing system, wherein the set of agent parameters defines: an agent identifier, an agent position, and an agent pose; wherein the agent identifier, the agent position, and the agent pose are extracted from the image data in parallel; wherein the agent identifier comprises personally identifying information (PII);
deleting the PII from the set of agent parameters, thereby anonymizing the set of agent parameters, and subsequently combining the set of agent parameters into a datafile;
receiving an event data request from a user system, wherein the event data request corresponds to the event class of the rare vehicle event; and
providing the datafile to the user system in response to the event data request.

10. The method of claim 9, wherein the image data comprises an image sequence defining a set of frames, wherein the agent pose and agent position are extracted from each frame of the set of frames, wherein the set of agent parameters defines an agent trajectory, and further comprising extracting the agent trajectory based on the agent pose and agent position corresponding to each frame of the set of frames.

11. The method of claim 10, further comprising providing the tagged image data to the user system in response to the event data request.

12. The method of claim 10, wherein the agent pose is extracted from each frame of the set of frames by a pose classifier, and the agent position is extracted in parallel from each frame of the set of frames by a position classifier.

13. The method of claim 12, wherein the pose classifier comprises a first convolutional neural network (CNN), and wherein the position classifier comprises a second CNN.

14. The method of claim 12, wherein extracting the agent trajectory comprises providing the image sequence, the agent pose corresponding to each frame, and the agent position corresponding to each frame to a trajectory estimator, and generating the agent trajectory at the trajectory estimator based on the image sequence, the agent pose corresponding to each frame, and the agent position corresponding to each frame.

15. The method of claim 14, wherein extracting the agent parameters is performed iteratively, and iterations subsequent to a first iteration of extracting the agent parameters comprises providing the agent pose, agent position, and agent trajectory extracted in the first iteration to the pose classifier, the position classifier, and the trajectory estimator.

16. The method of claim 9, further comprising generating a set of perturbed parameters based on the set of agent parameters, and combining the set of perturbed parameters and the set of agent parameters into the datafile.

17. The method of claim 16, wherein each of the set of agent parameters defines a parameter value, and wherein generating each perturbed parameter of the set of perturbed parameters comprises randomly sampling a gaussian distribution to generate the perturbed parameter, wherein the gaussian distribution is centered at the parameter value of an agent parameter of the set of agent parameters.

18. The method of claim 16, wherein generating the set of perturbed parameters comprises transforming the set of agent parameters based on a noise parameter.

19. The method of claim 18, wherein transforming the set of agent parameters based on the noise parameter comprises simulating sensor noise based on a model of a weather effect on sensor performance, and transforming the set of agent parameters to emulate the weather effect.

20. The method of claim 19, wherein the sensor model comprises at least one of a rangefinder sensor model and an image sensor model.

* * * * *